United States Patent [19]
Onozawa et al.

[11] Patent Number: 6,103,370
[45] Date of Patent: *Aug. 15, 2000

[54] HARD COAT SHEET

[75] Inventors: Yutaka Onozawa; Satoru Shoshi; Shunpei Watanabe, all of Saitama, Japan

[73] Assignee: Lintec Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/110,324

[22] Filed: Jul. 6, 1998

[30] Foreign Application Priority Data

Jul. 7, 1997 [JP] Japan ................................ 9-196538

[51] Int. Cl.$^7$ .............................. B32B 7/12; C09D 4/00
[52] U.S. Cl. .......................... 428/354; 428/343; 428/352; 428/447; 428/451; 428/423.5
[58] Field of Search .................................. 428/343, 352, 428/354, 447, 451, 423.7, 423.5

[56] References Cited

U.S. PATENT DOCUMENTS

| | | | |
|---|---|---|---|
| 5,250,336 | 10/1993 | Greuse et al. | 428/40 |
| 5,425,991 | 6/1995 | Lu | 428/352 |
| 5,804,301 | 9/1998 | Curatolo | 428/352 |

*Primary Examiner*—D. S. Nakarani
*Attorney, Agent, or Firm*—Armstrong, Westerman, Hattori, McLeland & Naughton

[57] ABSTRACT

A hard coat sheet comprises a base sheet, and a coat layer which is provided on the base sheet and formed of a resin composition containing 0.1 to 100 parts by weight of a radiation-curing silicone resin based on 100 parts by weight of a multi-functional acrylate. Thus, the hard coat sheet has an anti-fouling property, an anti-glare property and an antibacterial property together with an excellent hard coat property.

11 Claims, No Drawings

HARD COAT SHEET

BACKGROUND OF THE INVENTION

1. Field of the Invention

The present invention relates to a hard coat sheet which is suitable to be used for providing an anti-scattering property and a light (heat ray) shielding function to a window pane in a building or a vehicle, or to be used for preventing scribbling, for preventing the sticking of a bill, for preventing glare (by display for a television, a personal computer and the like), and which is excellent not only in abrasion resistance and wear resistance, but also in anti-fouling property, water repellence, oil repellence, anti-glare property and antibacterial property.

2. Description of the Related Art

In recent years, articles are widespread which are made by subjecting an adhesive film such as an anti-scattering film or a light shielding film for a window pane for a building or a vehicle, or a surface protecting laminate film to a hard coating treatment. A polyethylene terephthalate film is mainly used for the base sheet of each of these adhesive films, but many of the articles are made by subjecting the film to the hard coating treatment for the purpose of providing an abrasion (and/or wear) resistance.

However, the prior art film subjected to the hard coating treatment suffers from a problem that it is difficult to remove an oil-containing ink or dusts deposited on a surface of a hard coat. For a countermeasure therefor, the provision of the anti-fouling property is required in addition to the performance of the prior art coat.

As a result of the experiments made by the present inventors, it has been found that a hard coat sheet having excellent anti-fouling and water- and oil-repellent properties is produced by blending a radiation-curing silicone resin into an (acrylic) radiation-curing resin.

On the basis of such knowledge, it is an object of the present invention to provide a hard coat sheet having an anti-fouling property, an anti-glare property and an anti-bacterial property in addition to the performance of the above-described hard coat.

SUMMARY OF THE INVENTION

To achieve the above object, according to a first aspect and feature of the present invention, there is provided a hard coat sheet comprising a base sheet, and a coat layer which is provided on the base sheet and formed of a resin composition containing 0.1 to 100 parts by weight of a radiation-curing silicone resin based on 100 parts by weight of a multi-functional acrylate.

According to a second aspect and feature of the present invention, in addition to the first feature, the hard coat sheet contains 1 to 10 parts by weight of a photo-polymerization initiator in the resin composition.

According to a third aspect and feature of the present invention, in addition to the first or second feature, the hard coat sheet contains 0.5 to 50 parts by weight of a filler in the resin composition.

According to a fourth aspect and feature of the present invention, in addition to any of the first to third features, the hard coat sheet contains an anti-bacterial agent in the resin composition.

According to a fifth aspect and feature of the present invention, in addition to any of the first to fourth features, the hard coat sheet provides an adhesive agent layer on one side of the base sheet.

Even when an oil-containing ink or the like is deposited on the repellent surface, it is easily removed. Therefore, the hard coat sheet according to the present invention is also useful as a bill-scribbling preventing film.

DETAILED DESCRIPTION OF THE PREFERRED EMBODIMENT

Examples of the base sheets which may be used are resin films such as polyethylene terephthalate, polycarbonate, polyethylene naphthalate, polypropylene, polyvinyl chloride, polyethylene, polymethylmethacrylate, polyacrylonitrile, tri-acetyl cellulose and the like.

The base sheet may be transparent or opaque and may be colored or non-colored. For example, when the hard coat sheet is used as a light shielding film for a window, the base sheet may be selectively colored and clear, depending upon the type of an application.

Further examples of the base sheet are wood free paper, coated paper, kraft paper, thin paper and the like. The base sheet may be a sheet formed of any of the resin films and a sheet of paper which are laminated on each other.

It is preferable that the thickness of the base sheet is on the order of 16 to 250 $\mu$m.

The multi-functional acrylate constituting the resin composition is particularly not limited, if it is a radiation-curing acrylic resin having two or more functional groups such as a urethane acrylate, a polyester acrylate and the like, but it is preferable that any of the following acrylates is used: propylene glycoldi(meth)acrylate, pentaerythritol tri(meth)acrylate, trimethylpropane tri(meth)acrylate, dipentaerythritol penta(meth)acrylate, dipentaerythritol hexa(meth)acrylate, hexanediol di(meth)acrylate, ethyleneglycol di(meth)acrylate, bisphenol A, ethylene oxide-modified diacrylate and the like.

Examples of the radiation-curing silicone resin which may be used, are resins of a radical-added type containing an alkenyl group and a mercapte group, a hydrosilylating reaction type containing an alkenyl group and hydrogen atom, a cation polymerization type containing an epoxy group, a radical polymerization type containing a (meth)acrylate, and the like. It is preferable that the cation polymerization type containing an epoxy group and the radical polymerization type containing a (meth)acrylate are used.

Examples of the epoxy group-containing and acrylic group-containing silicone resins which may be used are epoxy-propoxypropyl-terminated polydimethyl siloxane, (epoxy-cyclohexylethyl)methyl siloxane/dimethyl siloxane copolymer, methacryloxypropyl-terminated polydimethyl siloxane, acryloxypropyl-terminated polydimethyl siloxane and the like.

For example, terminal-vinyl-polydimethyl siloxane, vinylmethyl siloxane homopolymer and the like may be also used as the vinyl-containing silicone resin.

The reason why 0.1 to 100 parts by weight of the radiation-curing silicone resin is blended based on 100 parts by weight of the multi-functional acrylate is that if the amount of radiation-curing silicone resin blended is less than 0.1 part by weight, the anti-fouling property is not obtained, and if the amount of radiation-curing silicone resin blended exceeds 100 parts by weight, the property of hardness is reduced.

When electron beam is used as the radiation, a hardened coating can be formed without addition of a polymerization initiator.

When ultraviolet ray is used as the radiation, a satisfactory hardened coating can be also formed by adding any of the following substances as a photo-polymerization initiator: 2-methyl-[4-(methylthio)phenyl]-2-morpholino-1-propanon (Irgacure 907 made by Ciba-Geigy Co.) and 1-hydroxycyclohexylpheny ketone (Irgacure 184 made by Ciba-Geigy Co.). Other photopolymerization initiators can be used such as benzophenone, acetophenone, benzoin, benzoinmethyl ether, benzoinethyl ether, benzoinisopropyl ether, benzoinisobutyl ether, benzoinbenzoic acid, benzoinmethyl benzoate, benzoindimethyl ketal, 2,4-diethylthioxanthene, benzyl diphenyl sulfide, tetramethylthiuram monosulfide, azobisisobutyl nitrile, benzyl, dibenzyl, diacetyl, β-chloroanthraquinone and the like.

In this case, the reason why the blending proportion is 1 to 10 parts by weight is that if the proportion is less than 1 part by weight, the polymerization initiating effect is not obtained, and if the proportion exceeds 10 parts by weight, the yellowing degree is larger to yellow the hard coat sheet, and the durability is also reduced.

Any of fillers such as silica (including colloidal silica), a silicone powder, mica, glass beads, a fine acrylic powder, hollow grains and the like may be contained in the resin composition to provide an anti-glare property. In this case, it is preferable that the amount of the filler is 0.5 to 50 parts by weight based on 100 parts by weight of the multi-functional acrylate. This is because if the amount of the filler is less than 0.5 parts by weight, the anti-glare property is not obtained, and if the amount exceeds 50 parts by weight, the strength of the coating is reduced.

The anti-bacterial agents which may be used include various anti-bacterial agents, e.g., silver-based inorganic anti-bacterial agents such as a silver-based inorganic anti-bacterial agent carried on zirconium phosphate, a silver-based inorganic anti-bacterial agent carried on zeolite, a silver-based inorganic anti-bacterial agent carried on calcium phosphate, a silver-based inorganic anti-bacterial agent carried on silica gel and the like; amino acid-based organic anti-bacterial agents such as an organic anti-bacterial agent containing an amino acid compound incorporated therein; nitrogen-containing sulfur-based organic anti-bacterial agents such as an organic anti-bacterial agent containing a nitrogen-containing sulfur-based compound incorporated therein; and the like. The anti-bacterial agent may be incorporated in the resin composition in a proper amount adapted to the used type, the anti-bacterial property and the retention time.

If desired, any of additives may be contained in the resin composition, such as a light stabilizer, an ultraviolet absorbent, a catalyst, a colorant, an anti-static agent, a lubricant, a leveling agent, an anti-foaming agent, a polymerization promoter, an anti-oxidant, a flame retardant, a infrared absorbent, a surfactant, a surface modifier and the like.

To form the coat layer, a procedure is employed which comprises preparing the resin composition containing 0.1 parts to 100 parts by weight of the radiation-curing silicone resin based on 100 parts by weight of the multi-functional acrylate, coating the resin composition on the base sheet by any coating process such as a gravure coating, a Meyer bar coating and the like, and as required, applying ultraviolet rays to the resin composition. In this manner, the cured coating can be formed simply and in an extremely short time.

It is generally preferable that the coat layer is formed at a thickness in a range of 1 to 10 μm.

If an adhesive layer is provided on a back of the base material having the coat layer formed thereon, the resulting hard coat sheet can be adhered to window panes for a building and a vehicle, and any other objects requiring an abrasion resistance, a wear resistance, an anti-fouling property, a water repellence, an oil repellence, an anti-glare property and an anti-bacterial property. This is convenient.

The adhesives include, for example, natural rubbers, synthetic rubbers, acrylic resins, polyvinyl ether resins, urethane resins, silicone resins and the like. Particular examples of the synthetic rubbers are styrene-butadiene rubber, polyisobutylene rubber, isobutylene-isoprene rubber, isoprene rubber, styrene-isoprene block copolymer, styrene-butadien block copolymer, styrene-ethylene-butylene block copolymer and the like. Particular examples of the acrylic resins are homopolymers and copolymers of acrylic acid, methyl acrylate, ethyl acrylate, propyl acrylate, butyl acrylate, 2-ethylhexyl acrylate, ethyl methcrylate, butyl methcrylate, acrylonitrile and the like. Particular examples of the polyvinyl ether resins are polyvinyl ether, polyvinyl isobutyl ether and the like. Particular examples of the silicone resins are dimethyl polysiloxane and the like.

These adhesives may be used alone or in combination of two or more thereof.

If required, a tackifier, a filler, a softening agent, an anti-oxidant, an ultraviolet absorbent, a cross linking agent and/or the like can be further incorporated in the adhesive. The tackifiers include rosin-based resins, terpene phenol resins, terpene resins, organic hydrocarbon-modified terpene resins, petroleum resins, coumarone-indene resins, styrene-based resins, phenol resin, xylene resin and the like. Fillers include zinc flower, titanium oxide, silica, calcium carbonate, barium sulfate and the like. The softening agents include a process oil, liquid rubbers, a plasticizer and the like. The anti-oxidants include anilide-based, phenol-based, phosphite-based, thioester-based substances and the like. The ultraviolet absorbents include benzophenone-based, benzotriazol-based substances and the like. The cross linking agents include epoxy-based, isocyanate-based, a metal chelate-based substances and the like.

The thickness of the adhesive layer may be usually in a range of 5 to 100 μm, preferably, 10 to 50 μm. To protect the adhesive surface, it is preferable that a release sheet is laminated thereon. Further, in the hard coat sheet according to the present invention, the base sheet may be subjected to a printing, and the coat layer or the adhesive layer may be provided, or if required, the adhesive layer may be subjected to a printing.

EXAMPLES

Examples of the present invention will be described below along with comparative examples.

All of the following incorporated amounts will be represented by part by weight, unless they will be particularly specified.

Example 1

A polyethylene terephthalate film (A4100 made by TOYOBO Co., Ltd.)having a thickness of 50 μm was used as the base sheet, and a coating agent having the following composition was applied at a thickness of 3 μm onto the base sheet by a Meyer bar.

| | |
|---|---|
| Pentaerythritol triacrylate | 100 |
| (tri-functional acrylate) | |
| (Aronix M-305 made by Toagosei Co., Ltd.) | |
| Epoxy-modified silicone resin | 0.1 |
| (epoxy group-containing cation polymerization type resin) | |
| (X-62-7617 made by Shin-Etsu Chemical Co., Ltd.) | |
| Photopolymerization initiator | 4 |

| | |
|---|---|
| (Irgacure 907 made by Ciba-Geigy Co.) | |
| Light stabilizer | 1.2 |
| (TINUVIN 292 made by Ciba-Geigy Co.) | |
| Ultraviolet absorbent | 1.2 |
| (TINUVIN 1130 made by Ciba-Geigy Co.) | |
| Toluene | 50 |

After application of the coating agent, 200 mJ/cm$^2$ of ultraviolet rays were irradiated to the coating agent to provide a hard coat sheet which also had an anti-fouling property.

Example 2

A polyethylene terephthalate film (A4100 made by TOYOBO Co., Ltd.)having a thickness of 50 μm was used as the base sheet, and a coating agent having the following composition was applied at a thickness of 3 μm onto the base sheet by the Meyer bar.

| | |
|---|---|
| Pentaerythritol triacrylate | 100 |
| (tri-functional acrylate) | |
| (Aronix M-305 made by Toagosei Co., Ltd.) | |
| Epoxy-modified silicone resin | 40 |
| (X-62-7617 made by Shin-Etsu Chemical Co., Ltd.) | |
| Photopolymerization initiator | 4 |
| (Irgacure 907 made by Ciba-Geigy Co.) | |
| Light stabilizer | 1.4 |
| (TINUVIN 292 made by Ciba-Geigy Co.) | |
| Ultraviolet absorbent | 1.4 |
| (TINUVIN 1130 made by Ciba-Geigy Co.) | |
| Toluene | 50 |

After application of the coating agent, 300 mJ/cm$^2$ of ultraviolet rays were irradiated to the coating agent to provide a hard coat sheet which also had an anti-fouling property.

Example 3

A polycarbonate film (Type C110 made by Teijin Co., Ltd.)having a thickness of 100 μm was used as the base sheet, and the base sheet was subjected to a corona treatment. Then, a coating agent having the following composition was applied at a thickness of 5 μm onto the base sheet by the Meyer bar.

| | |
|---|---|
| Mixture of dipentaerythritol pentaacrylate and | 100 |
| dipentaerythritol hexaacrylate | |
| (penta or more-functional acrylate) | |
| (Aronix M-400 made by Toagosei Co., Ltd.) | |
| Epoxy-modified silicone resin | 50 |
| (X-62-7617 made by Shin-Etsu Chemical Co., Ltd.) | |
| Photopolymerization initiator | 4 |
| (Irgacure 907 made by Ciba-Geigy Co.) | |
| Light stabilizer | 1.5 |
| (TINUVIN 292 made by Ciba-Geigy Co.) | |
| Ultraviolet absorbent | 1.5 |
| (TINUVIN 1130 made by Ciba-Geigy Co.) | |
| Toluene | 50 |

After application of the coating agent, 300 mJ/cm$^2$ of ultraviolet rays were irradiated to the coating agent to provide a hard coat sheet which also had an anti-fouling property.

Example 4

A polyethylene terephthalate film (A4100 made by TOYOBO Co., Ltd.) having a thickness of 50 μm was used as the base sheet, and a coating agent having the following composition was applied at a thickness of 3 μm onto the base sheet by the Meyer bar.

| | |
|---|---|
| Pentaerythritol triacrylate | 100 |
| (tri-functional acrylate) | |
| (Aronix M-305 made by Toagosei Co., Ltd.) | |
| Epoxy-modified silicone resin | 80 |
| (X-62-7617 made by Shin-Etsu Chemical Co., Ltd.) | |
| Photopolymerization initiator | 4 |
| (Irgacure 907 made by Ciba-Geigy Co.) | |
| Light stabilizer | 1.2 |
| (TINUVIN 292 made by Ciba-Geigy Co.) | |
| Ultraviolet absorbent | 1.2 |
| (TINUVIN 1130 made by Ciba-Geigy Co.) | |
| Toluene | 50 |

After application of the coating agent, 350 mJ/cm$^2$ of ultraviolet rays were irradiated to the coating agent to provide a hard coat sheet which also had an anti-fouling property.

Example 5

A polyethylene terephthalate film (A4100 made by TOYOBO Co., Ltd.)having a thickness of 50 μm was used as the base sheet, and a coating agent having the following composition was applied at a thickness of 4 μm onto the base sheet by the Meyer bar.

| | |
|---|---|
| Polyester acrylate | 90 |
| (tri or more-functional acrylate) | |
| (Aronix M-7100 made by Toagosei Co., Ltd.) | |
| Trimethylol propane triacrylate | 10 |
| (tri-functional acrylate) | |
| (Aronix M-309 made by Toagosei Co., Ltd.) | |
| Acrylate silicone resin | 0.1 |

((meth)acrylic group containing radical polymerization type resin)
(X-62-7570 made by Shin-Etsu Chemical Co., Ltd.)

| | |
|---|---|
| Photopolymerization initiator | 4 |
| (Irgacure 184 made by Ciba-Geigy Co.) | |
| Light stabilizer | 1 |
| (TINUVIN 292 made by Ciba-Geigy Co.) | |
| Ultraviolet absorbent | 1 |
| (TINUVIN 1130 made by Ciba-Geigy Co.) | |
| Toluene | 50 |

After application of the coating agent, 300 mJ/cm$^2$ of ultraviolet rays were irradiated to the coating agent to provide a hard coat sheet which also had an anti-fouling property.

Example 6

A polycarbonate film (Type C110 made by Teijin Co., Ltd.)having a thickness of 100 μm was used as the base sheet, and the base sheet was subjected to a corona treatment. Then, a coating agent having the following composition was applied at a thickness of 5 μm onto the base sheet by the Meyer bar.

| | |
|---|---:|
| Polyester acrylate | 100 |
| (tri or more-functional acrylate) | |
| (Aronix M-8060 made by Toagosei Co., Ltd.) | |
| Acrylate silicone resin | 10 |
| (X-62-7570 made by Shin-Etsu Chemical Co., Ltd.) | |
| Photopolymerization initiator | 4 |
| (Irgacure 907 made by Ciba-Geigy Co.) | |
| Toluene | 50 |

After application of the coating agent, 300 mJ/cm$^2$ of ultraviolet rays were irradiated to the coating agent to provide a hard coat sheet which also had an anti-fouling property.

Example 7

A polyethylene terephthalate film (A4100 made by TOYOBO Co., Ltd.)having a thickness of 50 μm was used as the base sheet, and a coating agent having the following composition was applied at a thickness of 4 μm onto the base sheet by the Meyer bar.

| | |
|---|---:|
| Bispheriol-A ethylene oxide-modified diacrylate | 100 |
| (di-functional acrylate) | |
| (KAYARAD R-551 made by Nippon Kayaku Co., Ltd.) | |
| Epoxy-modified silicone resin | 1 |
| (epoxy group-containing cation polymerization type resin) | |
| (UV-9430 made by Toshiba Silicone Co., Ltd.) | |
| Photopolymerization initiator | 4 |
| (Irgacure 907 made by Ciba-Geigy Co.) | |
| Catalyst | 0.01 |
| (UV9380C made by Toshiba Silicone Co., Ltd.) | |
| Toluene | 50 |

After application of the coating agent, 300 mJ/cm$^2$ of ultraviolet rays were irradiated to the coating agent to provide a hard coat sheet which also had an anti-fouling property.

Example 8

A polyethylene terephthalate film (A4100 made by TOYOBO Co., Ltd.) having a thickness of 50 μm was used as the base sheet, and a coating agent having the following composition was applied at a thickness of 3 μm onto the base sheet by the Meyer bar.

| | |
|---|---:|
| Pentaerythritol triacrylate | 100 |
| (tri-functional acrylate) | |
| (Aronix M-305 made by Toagosei Co., Ltd.) | |
| Epoxy-modified silicone resin | 40 |
| (X-62-7617 made by Shin-Etsu Chemical Co., Ltd.) | |
| Epoxy group-containing silicone powder | 4.2 |
| Torefil E-601 (filler) | |
| (made by Toray Dow Corning Silicone Co., Ltd.) | |
| Photopolymerization initiator | 4 |
| (Irgacure 907 made by Ciba-Geigy Co.) | |
| Toluene | 50 |

After application of the coating agent, 300 mJ/cm$^2$ of ultraviolet rays were irradiated to the coating agent to provide a hard coat sheet having an anti-fouling and anti-glare properties.

Then, an acrylic adhesive was applied at a thickness of 20 μm onto the side having no coat layer of the hard coat sheet by a roll knife coater, and after drying of the acrylic adhesive, the side subjected to a silicone release treatment of a release film made by subjecting a polyethylene terephthalate film to the silicone release treatment was adhered to the side having the acrylic adhesive layer of the hard coat sheet to provide an adhesive sheet.

Example 9

A polyethylene terephthalate film (A4100 made by TOYOBO Co., Ltd.)having a thickness of 50 μm was used as the base sheet, and a coating agent having the following composition was applied at a thickness of 3 μm onto the base sheet by the Meyer bar.

| | |
|---|---:|
| Pentaerythritol triacrylate | 100 |
| (tri-functional acrylate) | |
| (Aronix M-305 made by Toagosei Co., Ltd.) | |
| Epoxy-modified silicone resin | 40 |
| (X-62-7617 made by Shin-Etsu Chemical Co., Ltd.) | |
| Silver-based inorganic anti-bacterial agent | 1.4 |
| (NOVARON AG300 made by Toagosei Co., Ltd.) | |
| Photopolymerization initiator | 4 |
| (Irgacure 907 made by Ciba-Geigy Co.) | |
| Light Stabilizer | 1.4 |
| (TINUVIN 292 made by Ciba-Geigy Co.) | |
| Ultraviolet absorbent | 1.4 |
| (TINUVIN 1130 made by Ciba-Geigy Co.) | |
| Toluene | 50 |

After application of the coating agent, 200 mJ/cm$^2$ of ultraviolet rays were irradiated to the coating agent to provide a hard coat sheet having an anti-fouling and anti-bacterial properties.

Example 10

A polyethylene terephthalate film (A4100 made by TOYOBO Co., Ltd.)having a thickness of 50 μm was used as the base sheet, and a coating agent having the following composition was applied at a thickness of 2.5 μm onto the base sheet by the Meyer bar.

| | |
|---|---:|
| Pentaerythritol triacrylate | 100 |
| (tri-functional acrylate) | |
| (Aronix M-305 made by Toagosei Co., Ltd.) | |
| Epoxy-modified silicone resin | 40 |
| (X-62-7617 made by Shin-Etsu Chemical Co., Ltd.) | |
| Amino acid-based organic anti-bacterial agent | 1.4 |
| (Apasider Clear made by Sangi Co., Ltd.) | |
| Photopolymerization initiator | 4 |
| (Irgacure 907 made by Ciba-Geigy Co.) | |
| Toluene | 50 |

After application of the coating agent, 250 mJ/cm$^2$ of ultraviolet rays were irradiated to the coating agent to provide a hard coat sheet having an anti-fouling and anti-bacterial properties.

Comparative Example 1

A polyethylene terephthalate film (A4100 made by TOYOBO Co., Ltd.)having a thickness of 50 μm was used as the base sheet, and a coating agent having the following composition was applied at a thickness of 3 μm onto the base sheet by the Meyer bar.

| | |
|---|---|
| Pentaerythritol triacrylate (tri-functional acrylate) (Aronix M-305 made by Toagosei Co., Ltd.) | 100 |
| Photopolymerization initiator (Irgacure 907 made by Ciba-Geigy Co.) | 4 |
| Light Stabilizer (TINUVIN 292 made by Ciba-Geigy Co.) | 1 |
| Ultraviolet absorbent (TINUVIN 1130 made by Ciba-Geigy Co.) | 1 |
| Toluene | 50 |

After application of the coating agent, 150 mJ/cm$^2$ of ultraviolet rays were irradiated to the coating agent to provide a hard coat sheet (an acrylic hard coat sheet of the prior art type).

Comparative Example 2

A polyethylene terephthalate film (A4100 made by TOYOBO Co., Ltd.) having a thickness of 50 μm was used as the base sheet, and a coating agent having the following composition was applied at a thickness of 3 μm onto the base sheet by the Meyer bar.

| | |
|---|---|
| Epoxy-modified silicone resin (UV9430 made by Toshiba Silicone Co., Ltd.) | 100 |
| Catalyst (UV9380C made by Toshiba Silicone Co., Ltd.) | 1 |
| Toluene | 20 |

After application of the epoxy-modified silicone resin, 250 mJ/cm$^2$ of ultraviolet rays were irradiated thereto to provide a hard coat sheet.

Then, Examples 1 to 10 and Comparative Examples 1 and 2 were subjected to a characteristic test to provide results which are given in Tables 1 and 2 below.

TABLE 2

| | Co.Ex.1 | Co.Ex.2 |
|---|---|---|
| Haze (%) | 0.21 | 0.34 |
| Total light transmittance (%) | 89.92 | 90.77 |
| Pencil hardness | 2H | 6B |
| Scratch resistance | O | X |
| Dirt-removing property (dry wiping) | X | O |
| Dirt-removing property (wet wiping) | X | O |
| Contact angle <ethanol> (°) | 8 | 24 |
| Peel force <cellophane tape> (g/25 mm) | 750 | 35 |
| 60° gloss | 101.32 | 109.41 |
| Antibacterial property | — | — |

For each of the characteristics, each of Examples 1 to 10 and Comparative Examples 1 and 2 was tested in the following manners:

Haze: It was measured by a haze meter (made by Nippon Denshoku Kogyo Co., Ltd.) according to JIS K6714.

Total light transmittance: It was measured by the haze meter (made by Nippon Denshoku Kogyo Co. Ltd.) according to JIS K6714.

Pencil hardness: It was measured in a hand scratching manner according to JIS K5400.

Scratch resistance: A change generated in the surface of the coat layer of the hard coat sheet upon rubbing of the surface by a steel wool #0000 was observed. The hard coat sheet having the coat layer unscratched was represented by O, and the hard coat sheet having the coat layer scratched or made white was represented by X.

Dirt-removing property: Characters were written on the surface of the coat layer by an oil marking ink. After a lapse of three minutes, the characters were wiped away (In dry and wet manners) by a gauze, and the surface of the coat layer was observed. The hard coat sheet having the coat layer with no writing trace left thereon was represented by O, and the hard coat sheet having the coat layer with a writing trace left thereon was represented by X.

Contact angle: Ethanol (diameter of 2 mm or less) was dropped onto the coat layer of the hard coat sheet, and the angle of contact between the surface of the coat layer and the

TABLE 1

| | Ex.1 | Ex.2 | Ex3 | Ex.4 | Ex.5 | Ex.6 | Ex.7 | Ex.8 | Ex.9 | Ex.10 |
|---|---|---|---|---|---|---|---|---|---|---|
| Haze (%) | 0.13 | 0.19 | 0.13 | 0.18 | 0.21 | 0.15 | 0.21 | 12.85 | 1.47 | 0.43 |
| Total light transmittance (%) | 90.48 | 90.49 | 90.46 | 90.37 | 90.35 | 90.44 | 90.38 | 87.56 | 90.24 | 90.32 |
| Pencil hardness | 3H | 2H | 3H | H | 2H | 2H | 2H | 3H | 2H | 2H |
| Scratch resistance | O | O | O | O | O | O | O | O | O | O |
| Dirt-removing property (dry wiping) | O | O | O | O | O | O | O | O | O | O |
| Dirt-removing property (wet wiping) | O | O | O | O | O | O | O | O | O | O |
| Contact angle <ethanol> (°) | 20 | 36 | 36 | 36 | 18 | 20 | 20 | 38 | 36 | 36 |
| Peel force <cellophane tape> (g/25 mm) | 48 | 42 | 42 | 37 | 38 | 36 | 36 | 32 | 35 | 39 |
| 60° gloss | 145.63 | 141.69 | 155.37 | 140.18 | 138.56 | 141.73 | 139.42 | 69.86 | 143.90 | 109.77 |
| Antibacterial property | — | — | — | — | — | — | — | — | O | O | ethanol was measured within 1 minute after the dropping by use of a contact angle meter (made by Kyowa Interface Science Co., Ltd.)

Peel force: According to JIS Z0237, a cellophane tape (made by Nichiban Co., Ltd.) with a width of 25 mm was adhered in one reciprocation of a 2 kg roll to the surface of the coat layer of the hard coat sheet, and after a lapse of 20 minutes, the tape was peeled off at an angle of 180 degree and at a peeling-off speed of 300 mm/min.

60° gloss: It was measured by a glossimeter (made by Nippon Denshoku Kogyo Co., Ltd.) according to JIS K5400.

Antibacterial property: A colon bacillus liquid was inoculated onto the surface of the coat layer (3 cm×3 cm) and then, the hard coat sheet was wrapped. After leaving the resulting sheet to stand for 24 hours in a desiccator with water placed therein at 27° C., the number of living colon bacilli was measured. The hard coat sheet having a reduced number of living colon bacilli was represented by O, and the hard coat sheet having a non-reduced number of living colon bacilli was represented by X.

As apparent from Tables 1 and 2, the hard coat sheet according to the present invention can have an excellent anti-fouling property in addition to the hard coat performance. Further, as shown in Examples 8 to 10, the hard coat sheets can have an anti-glare property and an anti-bacterial property, while having the hard coat performance and the excellent anti-fouling property. Each of the hard coat sheets in Examples 1 to 7 and Example 10 of the present invention has a haze of 1% or less and a higher total light transmittance and hence, it is apparent that each of these hard coat sheets also has an excellent transparency. The hard coat sheet according to the present invention has a peel force of 100 g/25 mm or less, so that a bill adhered thereon can be peeled off simply. Therefore, it is obvious that the hard coat sheet can be used for preventing the sticking of a bill. Furthermore, it is obvious that the hard coat sheet according to the present invention can be used as a scribbling preventing film, because a dirt on the hard coat sheet can be easily removed. On the other hand, when either one of the multi-functional acrylate and the silicone resin, it is impossible to produce a hard coat sheet which has a hard coat performance and an anti-fouling property, both of which are satisfactory, as shown in Comparative Examples.

Therefore, in the hard coat sheet according to the present invention, it is obvious that the hard coat performance and the anti-fouling property can reconciled.

What is claimed is:

1. A coated sheet comprising a base sheet, and a coat layer which is provided on the base sheet, wherein said coat layer is formed of a resin composition containing a radiation-curing silicone resin and a multi-functional acrylate compound, the amount of said radiation-curing silicone resin being 0.1 to 100 parts by weight based on 100 parts by weight of said multi-functional acrylate compound, and wherein said coat layer has, after curing, a hardness of at least H, and an anti-fouling property measured by the absence of any visible trace of writing after writing with an oil marking ink on the coat layer is wiped off with a dry gauze or a wet gauze three minutes after said writing is applied.

2. A coated sheet according to claim 1, wherein said resin composition further includes 1 to 10 parts by weight of a photopolymerization initiator based on 100 parts by weight of said multi-functional acrylate compound.

3. A coated sheet according to claim 2, wherein said resin composition further includes 0.5 to 50 parts by weight of a filler based on 100 parts by weight of said multi-functional acrylate compound.

4. A coated sheet according to claim 2, wherein said resin composition further includes an anti-bacterial agent.

5. A coated sheet according to claim 2, further provided with an adhesive agent layer on the side of said sheet which is not in contact with said coat layer.

6. A coated sheet according to claim 1, wherein said resin composition further includes 0.5 to 50 parts by weight of a filler based on 100 parts by weight of said multi-functional acrylate compound.

7. A coated sheet according to claim 6, wherein said resin composition further includes an anti-bacterial agent.

8. A coated sheet according to claim 6, further provided with an adhesive agent layer on the side of said sheet which is not in contact with said coat layer.

9. A coated sheet according to claim 1, wherein said resin composition further includes an anti-bacterial agent.

10. A coated sheet according to claim 9, further provided with an adhesive agent layer on the side of said sheet which is not in contact with said coat layer.

11. A coated sheet according to claim 1, further provided with an adhesive agent layer on the side of said base sheet which is not the side in contact with said coat layer.

* * * * *